United States Patent
Yoo

(10) Patent No.: US 7,821,920 B2
(45) Date of Patent: Oct. 26, 2010

(54) FLUSHING PROCESSING UNIT AND METHOD OF SWITCHING DEVICE IN NETWORK USING SPANNING TREE PROTOCOL

(75) Inventor: Kwang-Seon Yoo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 12/073,454

(22) Filed: Mar. 5, 2008

(65) Prior Publication Data

US 2008/0219149 A1 Sep. 11, 2008

(30) Foreign Application Priority Data

Mar. 9, 2007 (KR) .................. 10-2007-0023635

(51) Int. Cl.
*G01R 31/08* (2006.01)
*H04L 12/28* (2006.01)
(52) U.S. Cl. .............. 370/216; 370/242; 370/389; 370/392; 370/395.52
(58) Field of Classification Search ............ None
See application file for complete search history.

(56) References Cited

U.S. PATENT DOCUMENTS

| | | | |
|---|---|---|---|
| 2002/0009092 A1* | 1/2002 | Seaman et al. | 370/406 |
| 2003/0016624 A1 | 1/2003 | Bare | |
| 2005/0021713 A1* | 1/2005 | Dugan et al. | 709/223 |
| 2006/0165223 A1* | 7/2006 | Dugan et al. | 379/15.02 |
| 2007/0260870 A1* | 11/2007 | Nissan et al. | 713/150 |
| 2007/0263554 A1* | 11/2007 | Finn | 370/256 |
| 2008/0025203 A1 | 1/2008 | Tallet | |

OTHER PUBLICATIONS

IEEE computer society, 802.1D Media Access Control (MAC) Bridges, Jun. 2004, pp. 1-281.*

* cited by examiner

*Primary Examiner*—Huy D Vu
*Assistant Examiner*—Brandon Renner
(74) *Attorney, Agent, or Firm*—H.C. Park & Associates, PLC

(57) ABSTRACT

A flushing processing unit and method of a switching device in a network using Spanning Tree Protocol (STP). The method includes determining, by a switching device, whether there is a failure link; when there is the failure link, determining, by the switching device, which one of a root port and a designated port connects to the failure link; when it is determined that the root port connects to the failure link, changing, by the switching device, a filtering database and changing port information of a host address registered to the root port into preset alternate port information; and sending, by the switching device, a Transmission Control Protocol (TCP) message through an alternate port.

22 Claims, 7 Drawing Sheets

⊗ : FLUSHING SHOULD BE PERFORMED FOR HOST ADDRESS REGISTERED TO PORT
■ : FLUSHING FOR HOST ADDRESS REGISTERED TO PORT
→ : TCN MESSAGE SENT IN ARROW DIRECTION
-//- : DATA TRANSMISSION BETWEEN TWO SWITCHING DEVICES IS BLOCKED

FIG. 2A

MSTP MEMBER TABLE

| INSTANCE | VLAN | MEMBERS |
|---|---|---|
| 1 | 100 | P1 P2 P3 |
| 2 | 200 | P2 P3 P4 |
| 3 | 300 | P1 P2 |

FIG. 2B

FILTERING DATABASE

| REGISTERED HOST ADDRESS | VLAN | PORT |
|---|---|---|
| MAC101 | 100 | P1 |
| MAC201 | 200 | P2 |
| MAC301 | 300 | P1 |

- ⊗ : HOST ADDRESS REGISTERED TO PORT HAS TO BE UPDATED (FLUSHING OR ADDRESS SHIFT)
- ■ : FLUSHING FOR HOST ADDRESS REGISTERED TO PORT
- □ : HOST ADDRESS REGISTERED TO PORT MARKED AS INVALID
- Ⓤ : HOST ADDRESS REGISTERED TO PORT SHIFTED TO DIFFERENT PORT
- → : TCN MESSAGE SENT IN ARROW DIRECTION
- ---▶ : TCP MESSAGE
- -//- : DATA TRANSMISSION BETWEEN TWO SWITCHING DEVICES IS BLOCKED

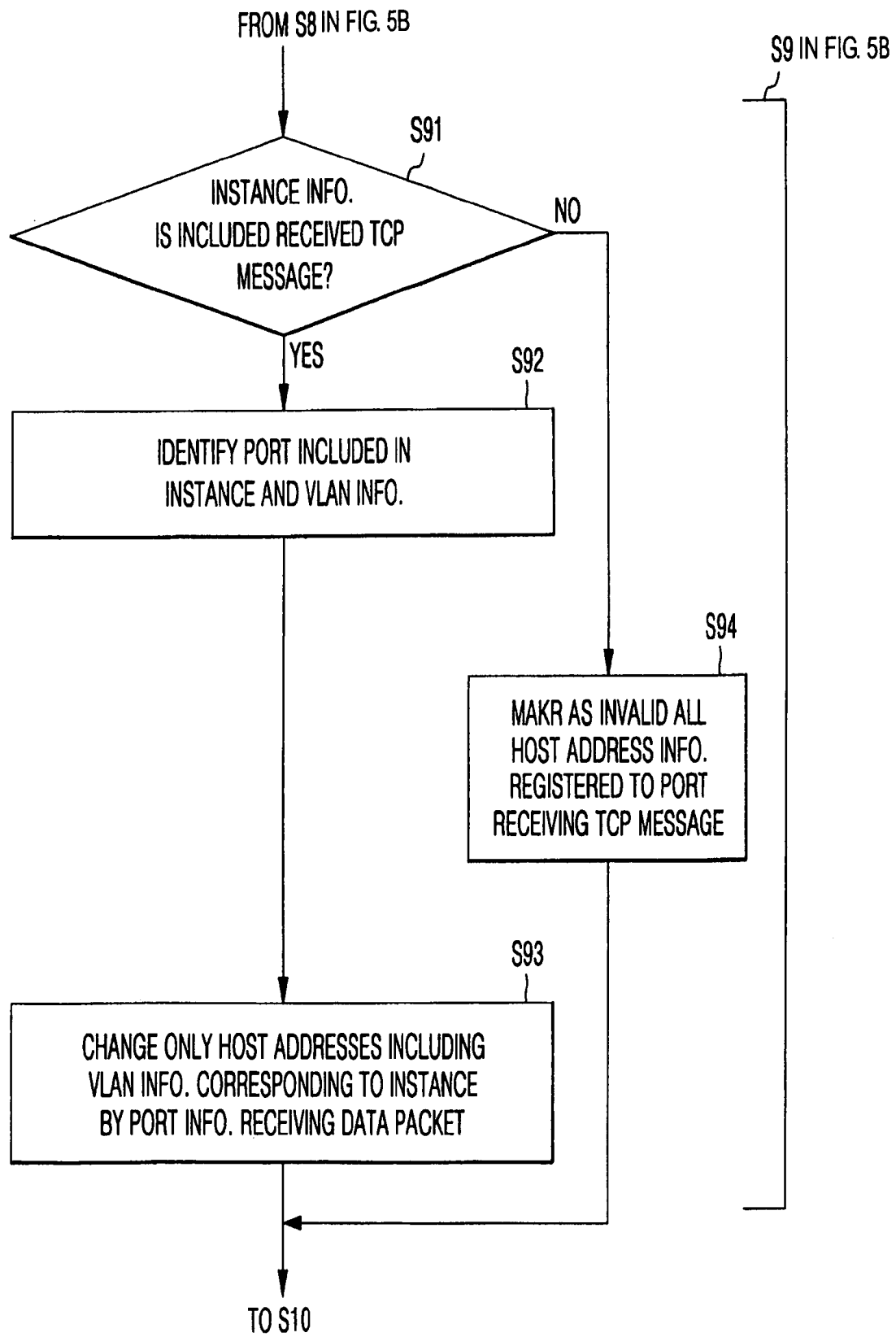

FLUSHING PROCESSING UNIT AND METHOD OF SWITCHING DEVICE IN NETWORK USING SPANNING TREE PROTOCOL

CLAIM OF PRIORITY

This application makes reference to, incorporates the same herein, and claims all benefits accruing under 35 U.S.C. §119 from an application for FLUSHING PROCESSING UNIT AND METHOD OF SWITCHING DEVICE IN NETWORK USING SPANNING TREE PROTOCOL earlier filed in the Korean Intellectual Property Office on 9 Mar. 2007 and there duly assigned Serial No. 2007-0023635.

BACKGROUND OF THE INVENTION

1. Field of the Invention

The present invention relates to a flushing processing unit and method of a switching device in a network using Spanning Tree Protocol (STP), and more particularly, to a flushing processing unit and method of a switching device in a network using Spanning Tree Protocol (STP) for preventing flushing at unnecessary ports and unnecessary switches upon topology change and reducing a switch process load and a network load caused by flooding.

2. Description of the Related Art

In a normal network configuration state, address information of a registered host is stored in a filtering database. Address information changes only when a physical position of a host changes.

Upon a change in topology, however, each switch equipment processing switch functions, Spanning Tree Protocol (STP) flushes and registers the stored address information on the basis of a new topology.

Contemporary methods for reducing unnecessary flushing were proposed, but unnecessary flushing still remains.

Institute of Electrical and Electronics Engineers (IEEE) 802.1D Spanning Tree Protocol (STP) was developed to recover from a failure between bridges or switches providing layer-2 switching or prevent undesirable loops in a network. That is, Spanning Tree Protocol (STP) is a technology for securing network stability by detecting and removing undesirable loops that cause the indefinite transmission of packets through two or more network paths in configuring a network, and upon the occurrence of a failure, configuring a new topology to recover from the failure.

IEEE 802.1w Rapid Spanning Tree Protocol (RSTP) was developed to provide a solution to a problem of Spanning Tree Protocol (STP) in which reconfiguration is slow in the event of topology change.

IEEE 802.1s Multiple Spanning Tree Protocol (MSTP) is a way to group Virtual Local Area Networks (VLANs) and balance network load in Virtual Local Area Networks (VLAN)-aware switch. IEEE 802.1s Multiple Spanning Tree Protocol (MSTP) was developed to configure several instances on the basis of Rapid Spanning Tree Protocol (RSTP) and operate Rapid Spanning Tree Protocol (RSTP) by one per instance.

In cases where a specific link on a network fails and where a bridge priority or port priority changes, a change in a path actually transmitting data packets occurs, changing an active topology.

In the event of generation of an active topology, a host address stored in a filtering database should be re-registered with new information.

For this, information of the filtering database is flushed such that new information is registered.

In cases where the filtering database is flushed, flooding takes place because the host address (a Media Access Control (MAC) address in Ethernet) for forwarding packet over the network has not been registered.

Flooding increases a load in the whole network. Thus, it is desirable to avoid flooding in Spanning Tree Protocol (STP) as possible.

If a change in topology takes place, a corresponding bridge sends a Topology Change Notification (TCN) message (in Rapid Spanning Tree Protocol (RSTP), Bridge Protocol Data Unit (BPDU) is set with a Topology Change (TC) bit) to notify the event.

Upon receiving the Topology Change Notification (TCN) message, a bridge deletes host addresses registered through all other ports excepting a port receiving the Topology Change Notification (TCN) message, from the filtering database.

In order to avoid flooding if possible during the evolution from Spanning Tree Protocol (STP), Rapid Spanning Tree Protocol (RSTP) to Multiple Spanning Tree Protocol (MSTP), proposed were methods for efficiently detecting a topology change to reconfigure an active topology and methods for efficiently flushing a filtering database as follows.

Unlike IEEE 802.1D defining unconditionally that a change in a port state between blocking and forwarding is a change in topology, Rapid Spanning Tree Protocol (RSTP) defines that a change in a port state from blocking to forwarding is a change in topology.

In Rapid Spanning Tree Protocol (RSTP), a change in an edge port state does not lead to a change in topology.

For this, AutoEdge State Machine capable of detecting an edge port automatically was proposed.

In Rapid Spanning Tree Protocol (RSTP), an optional statement is a function of registering host addresses, which have been registered to a root port, to an alternate port in cases where the root port fails and the alternate port changes into the root port.

In Multiple Spanning Tree Protocol (MSTP), a Bridge Protocol Data Unit (BPDU) includes an independent Topology Change Notification (TCN) message for each instance.

Thus, proposed was an efficient method in which, upon receiving a corresponding Topology Change Notification (TCN) message for a corresponding instance, flushing is performed only for a port belonging to the instance with no flushing for a whole port excepting a reception port.

In a contemporary sequence of events occurring when one link fails in an Spanning Tree Protocol (STP) network including one or more switching devices, flushing happens unnecessarily in all switches connecting on topology instead of only happening to related ports, therefore, a network load is unnecessarily increased.

Additionally, deleting and/or registering a host address is again performed, which causes a deterioration of the process performance of the switch.

New packets are forwarded via a new active topology and are re-registered to the filtering database, so normal data transmission is again performed; however, there is a drawback that while forwarding and re-registering, flooding for a corresponding host address takes place, thus causing an increase of the entirety of the network load.

SUMMARY OF THE INVENTION

It is therefore, an object of the present invention to provide an improved flushing processing unit and method of a switching device in a network using Spanning Tree Protocol (STP) to overcome the foregoing problems stated above.

It is another object of the present invention to provide a flushing processing unit and method of a switching device in a network using Spanning Tree Protocol (STP), for preventing flushing at unnecessary ports and unnecessary switches upon topology change and reducing a switch process load and a network load caused by flooding.

According to an aspect of the invention, the invention provides a flushing processing unit of a switching device in a network using Spanning Tree Protocol (STP). The unit includes a link failure determiner for determining whether a link failure occurs; a block port determiner for determining which one of a root port and a designated port connects to the failure link; a Transmission Control Protocol (TCP) message processor for sending a Transmission Control Protocol (TCP) message through a preset alternate port if the block port determiner determines that the root port connects to the failure link; and a host address manager for changing a filtering database and changing port information of a host address registered to the root port connecting to the failure link into information on an alternate port sending the Transmission Control Protocol (TCP) message.

The unit may further include a host address shift determiner for determining a host address shift depending on whether a data packet from a host registered to the port of the failure link is received through a different port.

If the blocking port determiner determines that the designated port connects to the failure link, the host address manager may mark, as invalid, host address information registered to the designated port and then, if the host address shift determiner identifies a host address shift, changes the filtering database and changes port information of the invalid-marked host address information into information on a different port receiving a data packet from a different switching device.

After the procedure of marking, as invalid, the host address information registered to the designated port, the host address manager may remove an invalid-marked host address if the host address shift determiner does not identify the host address shift.

If the procedure of receiving a Transmission Control Protocol (TCP) message through any port in state where there is no port with the failure link, the host address manager may mark, as invalid, host address information registered to the port receiving the Transmission Control Protocol (TCP) message.

The host address manager may register host address information of a host and port information to the filtering database if the host address shift determiner identifies an address shift of the host and a host address of the host has not been registered to the filtering database.

If the host address shift determiner identifies an address shift of a host and a host address of the host has been registered to the filtering database, the host address manager changes the filtering database by information on the port to which the host address shift is implemented for all invalid-marked host address information.

The host address manager may determine whether a Transmission Control Protocol (TCP) message includes instance information if receiving the Transmission Control Protocol (TCP) message from any switching device and identifies an Multiple Spanning Tree Protocol (MSTP) member table and changes port information only for host address information including the instance information and marked as invalid if the Transmission Control Protocol (TCP) message includes the instance information.

The host address manager may identify port information included in instance information of the Multiple Spanning Tree Protocol (MSTP) member table and Virtual Local Area Network (VLAN) information and changes port information only for a host address of a port having an inclusion of Virtual Local Area Network (VLAN) information in the filtering database.

The Multiple Spanning Tree Protocol (MSTP) member table may include instance information, Virtual Local Area Network (VLAN) information and port information.

The filtering database may include registered host address information, Virtual Local Area Network (VLAN) information and port information.

The Transmission Control Protocol (TCP) message processor may send a Transmission Control Protocol (TCP) message through a port not receiving the Transmission Control Protocol (TCP) message if receiving the Transmission Control Protocol (TCP) message through any port from a different switching device.

The host address manager may wait for a predetermined standby time after marking, as invalid, a host address of any port.

According to another aspect of the invention, there is provided a flushing processing method of a switching device in a network using Spanning Tree Protocol (STP). The method includes determining, by a switching device, whether there is a failure link; when there is the failure link, determining, by the switching device, which one of a root port and a designated port connects to the failure link; when it is determined that the root port connects to the failure link, changing, by the switching device, a filtering database and changing port information of a host address registered to the root port into preset alternate port information; and sending, by the switching device, a Transmission Control Protocol (TCP) message through an alternate port.

The method may further include, when the designated port connects to the failure link, marking, as invalid, by the switching device, a host address or a Media Access Control (MAC) address registered to the designated port; determining, by the switching device, whether a data packet from any host registered to the designated port is received through a different port; and when the data packet is received through the different port, changing, by the switching device, the filtering database and changing port information of all host addresses registered to the designated port and marked as invalid into port information receiving the data packet.

The method may additionally include, that when there is not the failure link, determining, by the switching device, whether the switching device receives a Transmission Control Protocol (TCP) message from a different switching device; when the Transmission Control Protocol (TCP) message is received from the different switching device, marking, as invalid, by the switching device, all host address information registered to a port receiving the Transmission Control Protocol (TCP) message; determining, by the switching device, whether a data packet from any host is received through the port receiving the Transmission Control Protocol (TCP) message; and when the data packet is received through a different port not receiving the Transmission Control Protocol (TCP) message, changing, by the switching device, the filtering database and changing port information of all host addresses registered to the port receiving the Transmission Control Protocol (TCP) message into information on a port receiving the data packet.

The method may also include, when the data packet from any host is not received through the different port not receiving the Transmission Control Protocol (TCP) message, terminating Transmission Control Protocol (TCP) message processing by the switching device.

The procedure of marking, as invalid, all the host address information registered to the port receiving the Transmission Control Protocol (TCP) message, may include determining, by the switching device, whether the Transmission Control Protocol (TCP) message includes specific instance information; when the Transmission Control Protocol (TCP) message includes the specific instance information, identifying, by the switching device, a port included in a corresponding instance and Virtual Local Area Network (VLAN) information; and changing, by the switching device, the filtering database and changing only host addresses including Virtual Local Area Network (VLAN) information corresponding to an instance among all host addresses registered to a corresponding port, by information on a port receiving a data packet.

The method may further include, when the received Transmission Control Protocol (TCP) message does not include the specific instance information, marking, as invalid, by the switching device, all the host address information registered to the port receiving the Transmission Control Protocol (TCP) message.

The procedure of identifying the port, included in the corresponding instance and the Virtual Local Area Network (VLAN) information, may identify a Multiple Spanning Tree Protocol (MSTP) member table including instance information, Virtual Local Area Network (VLAN) information and port information.

The procedure of changing, by the port receiving the data packet, only the host addresses including the Virtual Local Area Network (VLAN) information corresponding to the instance identifies the filtering database including registered host address information, Virtual Local Area Network (VLAN) information and port information.

The procedure marking, as invalid, the host address registered to the designated port when receiving the Transmission Control Protocol (TCP) message from the different switching device may wait for a predetermined standby time for a change in topology after marking, as invalid, the host address.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 2A to 2B are diagrams illustrating an Multiple Spanning Tree Protocol (MSTP) member table and a filtering database of a switching device of the Spanning Tree Protocol (STP) network of FIG. 1;

FIG. 6 is a flow diagram illustrating a flushing processing method using an Multiple Spanning Tree Protocol (MSTP) in the flushing processing method of FIGS. 5A and 5B.

DETAILED DESCRIPTION OF THE PREFERRED EMBODIMENTS

Figure 1A:
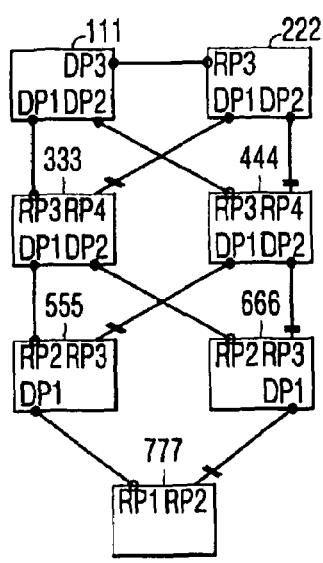
FIGS. 1A to 1F are diagrams illustrating a contemporary flushing processing method when a link fails in a network using Spanning Tree Protocol (STP)

Reference will now be made in detail to exemplary embodiments of the present invention, examples of which are illustrated in the accompanying drawings, wherein like reference numerals refer to like elements throughout. Contemporary art and exemplary embodiments are described below to explain the present invention with reference to the figures.

FIGS. 1A to 1F are diagrams illustrating a contemporary flushing processing method when a link fails in a network using Spanning Tree Protocol (STP).

FIGS. 1A to 1F show a sequence of events occurring when one link fails in an Spanning Tree Protocol (STP) network including one or more switching devices.

As shown in FIGS. 1A to 1F, multiple switching devices, i.e., a switching device 111, a switching device 222, a switching device 333, a switching device 444, a switching device 555, a switching device 666 and a switching device 777, exist in the Spanning Tree Protocol (STP) network. DP denotes a designated port, and RP denotes a root port.

A root port is a port closest to a root bridge in terms of path cost. The Spanning Tree Algorithm (STA) elects a single root bridge in the whole bridged network (per-Virtual Local Area Network (VLAN)). The root bridge sends Bridge Protocol Data Units (BPDUs). The root bridge is the only bridge in the network that does not have a root port. A designated port is a port sending the best Bridge Protocol Data Units (BPDUs) on a segment to which it is connected. In a given segment, there is only one path toward the root bridge. All bridges connected to the given segment determine a bridge sending the best Bridge Protocol Data Unit (BPDU) as the designated bridge for this given segment. A port on this determined bridge is a designated port.

In FIG. 1A, when a link L100 between switching device 555 and switching device 777 fails, flushing should be performed for ports 101, 102, 104 and 108 because of a change in paths between switching devices.

Figure 1B:
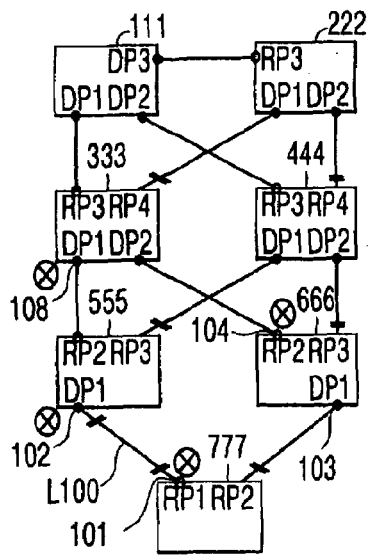

In FIG. 1B, switching devices 555 and 777 primarily have to perform flushing for the corresponding ports 101 and 102 that are blocked.

Figure 1C:
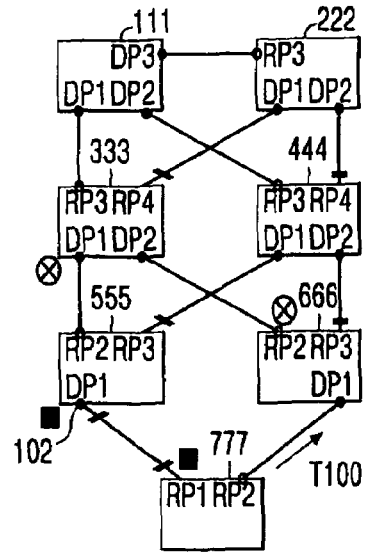

In FIG. 1C, switching device 777 sends a Topology Change Notification (TCN) message or an Rapid Spanning Tree Protocol (RSTP) Bridge Protocol Data Unit (BPDU) with TC set to switching device 666 (T100).

Figure 1D:
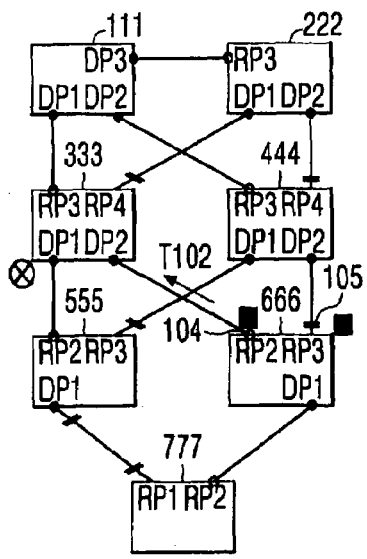

In FIG. 1D, upon receiving the Topology Change Notification (TCN) message, switching device 666 performs flushing for all other ports 104 and 105 and sends the Topology Change Notification (TCN) message to a switching device 333 (T102).

Figure 1E:
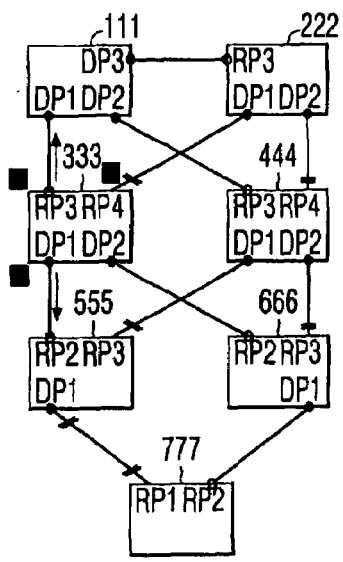

In FIG. 1E, upon receiving the Topology Change Notification (TCN) message, switching device 333 performs flushing for all other ports and sends the Topology Change Notification (TCN) message to switching devices 111 and 555.

Figure 1F:
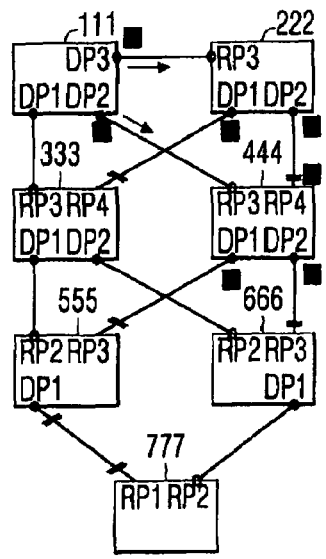

In FIG. 1F, upon receiving the Topology Change Notification (TCN) message, switching device 111 likewise performs flushing for all other ports and sends the Topology Change Notification (TCN) message to switching devices 222 and 444. Switching devices 222 and 444 likewise perform a flushing process.

As shown in FIG. 1B, flushing is actually required only for four ports 101, 102, 104 and 108; however, according to a current technology, flushing happens unnecessarily in all switches connecting on topology, increasing a network load and in addition, even deleting/registering a host address is again performed, deteriorating a process performance of the switch.

FIGS. 2A to 2B are diagrams illustrating an Multiple Spanning Tree Protocol (MSTP) member table and a filtering database of a switching device of the Spanning Tree Protocol (STP) network of FIG. 1.

A switching device supporting the Multiple Spanning Tree Protocol (MSTP) includes an Multiple Spanning Tree Protocol (MSTP) member table of FIG. 2A and a filtering database of FIG. 2B.

In an Multiple Spanning Tree Protocol (MSTP) table, instance index, Virtual Local Area Network (VLAN) index and members index along with corresponding values are stored. In a filtering database, registered host address index, Virtual Local Area Network (VLAN) index, and port index along with corresponding values are stored. Upon a change in one instance, the switching device performs flushing for all corresponding members, that is, for all host addresses corresponding to a corresponding port.

In details, in cases where a topology change happens in instance 2, flushing does not occur at a port (P1) according to a way that a Topology Change Notification (TCN) message corresponding to each instance may be included in one Multiple Spanning Tree Protocol (MSTP) Bridge Protocol Data Unit (BPDU).

In cases where a topology change takes place in instance1 and a Topology Change Notification (TCN) message is received, flushing occurs at the port (P1) and hence, it occurs that MAC address MAC301 in addition to MAC address MAC101 registered through instance1 is deleted from the filtering database.

Thus, new packets are forwarded via a new active topology and are re-registered to the filtering database, so normal data transmission is again performed; however, there is a drawback that while so, flooding for a corresponding host address takes place, causing an increase of a whole network load.

The present invention will now be described more fully hereinafter with reference to the accompanying drawings, in which preferred embodiments of a flushing processing unit and method of a switching device in a network using Spanning Tree Protocol (STP) of the invention are shown. It will be understood by those having an ordinary knowledge in the art that a system described below is merely exemplified for describing the invention with no limit to the scope of the present invention.

Figure 3:
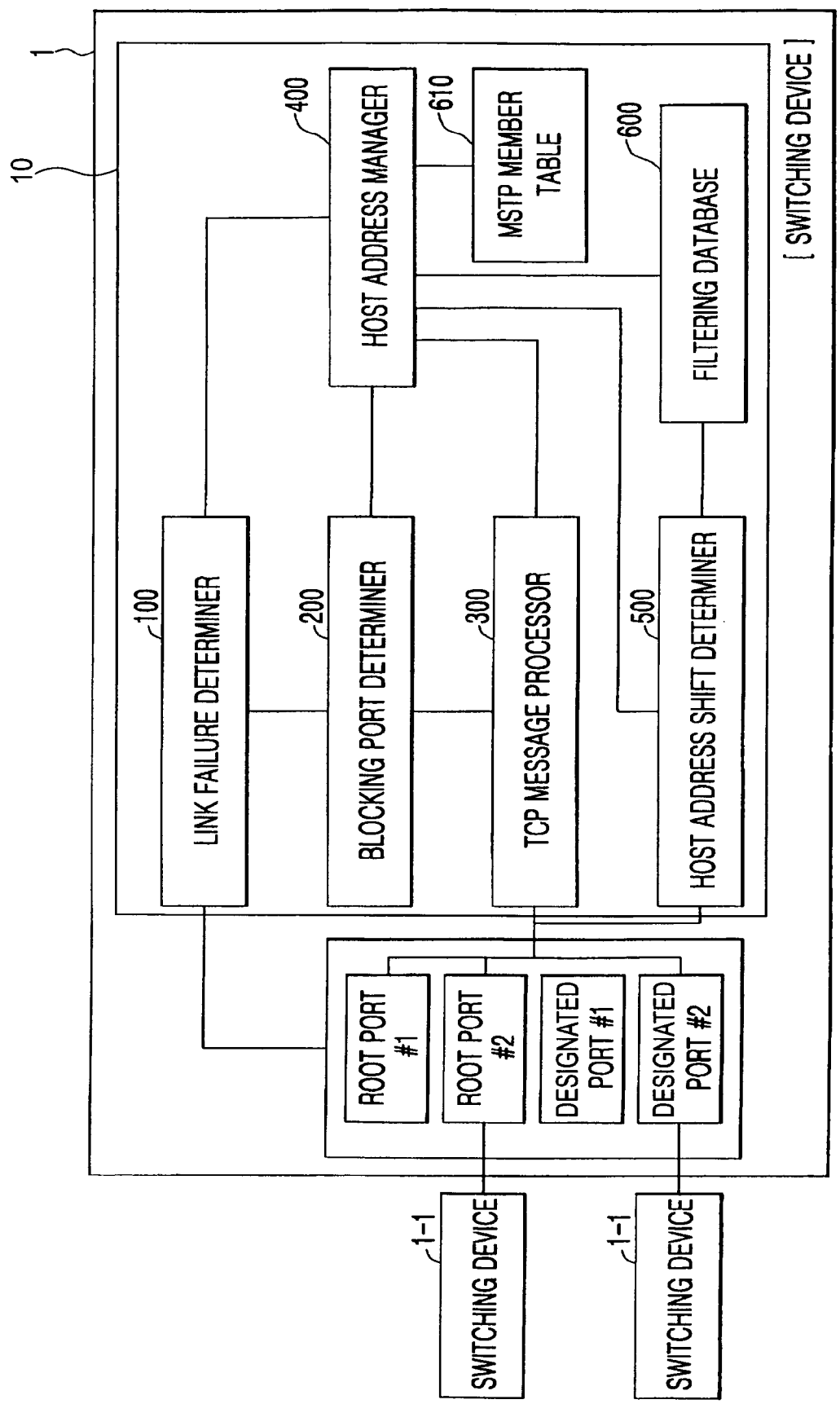
FIG. 3 is a block diagram illustrating a construction of a flushing processing unit of a switching device in a network using Spanning Tree Protocol (STP) constructed according to the present invention.

FIG. 3 is a block diagram illustrating a construction of a flushing processing unit of a switching device in a network using Spanning Tree Protocol (STP) constructed according to the present invention. A flushing processing unit 10 of a switching device 1 includes a link failure determiner 100, a blocking port determiner 200, a Transmission Control Protocol (TCP) message processor 300 and a host address manager 400, and further includes a host address shift determiner 500, a filtering database 600 and an Multiple Spanning Tree Protocol (MSTP) member table 610.

Link failure determiner 100 determines whether a link failure occurs.

Blocking port determiner 200 determines which one of a root port and a designated port connects to the failure link.

Transmission Control Protocol (TCP) message processor 300 sends a Transmission Control Protocol (TCP) message to a different switching device 1-1 through a preset alternate port when the blocking port determiner 200 determines that the root port connects to the failure link. Meantime, Transmission Control Protocol (TCP) message processor 300 sends a Transmission Control Protocol (TCP) message through a port not receiving the Transmission Control Protocol (TCP) message if receiving the Transmission Control Protocol (TCP) message from a different switching device 1-1 through any port.

Host address manager 400 changes filtering database 600 and changes port information of a host address registered to the root port connecting to the failure link into information on the alternate port sending the Transmission Control Protocol (TCP) message.

When blocking port determiner 200 determines that the designated port connects to the failure link, host address manager 400 marks, as invalid, host address information registered to the designated port. After that, if host address shift determiner 500 identifies a host address shift, host address manager 400 changes filtering database 600 and changes port information of the invalid-marked host address information into information on a different port receiving a data packet from a different switching device 1-1.

After marking, as invalid, the host address information registered to the designated port, host address manager 400 removes the invalid-marked host address information if host address shift determiner 500 does not identify the host address shift.

If receiving a Transmission Control Protocol (TCP) message through any port in state where there is no port with a link failure, host address manager 400 marks, as invalid, host address information registered to the port receiving the Transmission Control Protocol (TCP) message.

Host address manager 400 registers host address information of a host and port information to filtering database 600 when host address shift determiner 500 identifies an address shift of the host and a host address of the host has not been registered to filtering database 600.

Host address manager 400 changes filtering database 600 by information on a port to which an address shift of a host is implemented for all invalid-marked host address information when host address shift determiner 500 identifies the address shift of the host and a host address of the host has been registered to filtering database 600.

Upon receiving a Transmission Control Protocol (TCP) message from any switching device, host address manager 400 determines whether the Transmission Control Protocol (TCP) message includes instance information. If the Transmission Control Protocol (TCP) message includes the instance information, host address manager 400 identifies the Multiple Spanning Tree Protocol (MSTP) member table and changes port information only for host address information that includes the instance information and is marked as invalid.

Host address manager 400 identifies port information included in instance information of the Multiple Spanning Tree Protocol (MSTP) member table and Virtual Local Area Network (VLAN) information and changes port information only for a host address of a port having an inclusion of Virtual Local Area Network (VLAN) information in filtering database 600.

Multiple Spanning Tree Protocol (MSTP) member table 610 includes instance information, Virtual Local Area Network (VLAN) information and port information. Filtering database 600 includes registered host address information, Virtual Local Area Network (VLAN) information and port information.

Host address shift determiner 500 determines a host address shift depending on whether a data packet from a host registered to a port of a failure link is received through a different port.

Host address manager 400 waits for a predetermined time after marking, as invalid, a host address of any port.

FIGS. 4A to 4F are diagrams illustrating a flow of a Transmission Control Protocol (TCP) message in a flushing processing unit of a switching device and an operation of each switching device in the Spanning Tree Protocol (STP) network of FIG. 3.

A detailed description of general function and operation of each of the elements are omitted and a description of operation of the invention is made below with reference to FIGS. 4A to 4F.

Figure 4A:
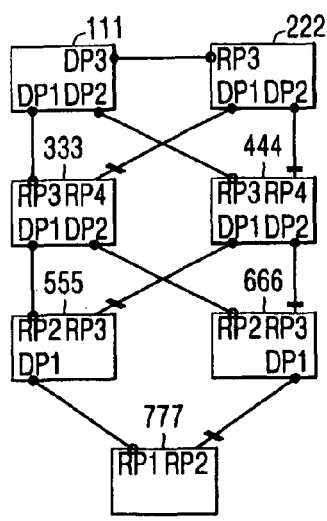
FIGS. 4A to 4F are diagrams illustrating a flow of a Transmission Control Protocol (TCP) message in a flushing processing unit of a switching device and an operation of each switching device in the Spanning Tree Protocol (STP) network of FIG. 3.

First, a description for a case where a link between a switching device 555 and a switching device 777 fails in an initial network shown in FIG. 4A is made below.

Figure 4B:
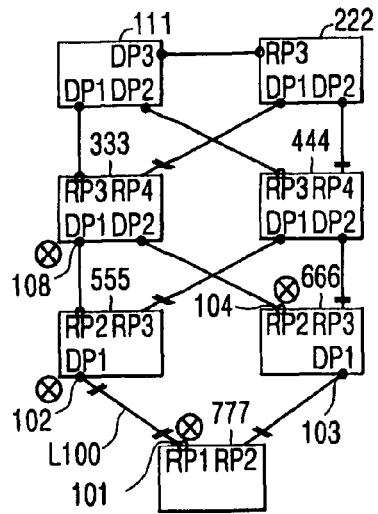

Link failure determiner 100 of switching device 777 determines whether a link failure occurs. In detail, as shown in FIG. 4B, link failure determiner 100 can identify that a link (L100) between switching devices 555 and 777 fails.

When link failure determiner 100 identifies a link failure, blocking port determiner 200 of switching device 777 determines which one of a root port and a designated port connects to the failure link.

Figure 4C:
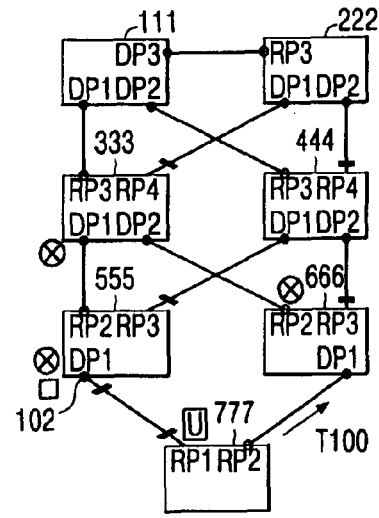

When root port RP1 of switching device 777 connects to the failure link, Transmission Control Protocol (TCP) message processor 300 of switching device 777 sends a Transmission Control Protocol (TCP) message to a different switching device, i.e., switching device 666 through a preset alternate root port RP2 as shown in FIG. 4C.

Host address manager 400 of switching device 777 changes filtering database 600 and changes root port RP1 information of a host address registered to root port RP1 connecting to the failure link into information on alternate root port RP2 sending the Transmission Control Protocol (TCP) message.

Also, link failure determiner 100 of switching device 555 determines whether a link failure occurs. In detail, as shown in FIG. 4B, link failure determiner 100 can identify that a link L100 between switching devices 555 and 777 fails.

After that, blocking port determiner 200 of switching device 555 determines which one of a root port and a designated port connects to the failure link if link failure determiner 100 identifies the link failure.

As blocking port determiner 200 of switching device 555 identifies that a designated port DP1 connects to the failure link, as shown in FIG. 4C, host address manager 400 of switching device 555 marks, as invalid, host address information registered to designated port DP1.

After that, when host address shift determiner 500 of switching device 555 identifies a host address shift, host address manager 400 of switching device 555 has to change filtering database 600 and change designated port DP1 information of the invalid-marked host address information into information on a different designated port DP2 or DP3 receiving a data packet from a different switching device 333 or 444; however, as shown in FIG. 4C, switching device 555 does not receive a data packet from any host and thus, host address manager 400 of switching device 555 deletes all the host address information registered to designated port DP1. That is, the data packet from switching device 777 is forwarded to switching device 333 through switching device 666 and the data packet of switching device 333 is forwarded to switching device 111. In conclusion, the data packet of the host from switching device 777 is not forwarded to switching device 555.

Figure 4D:
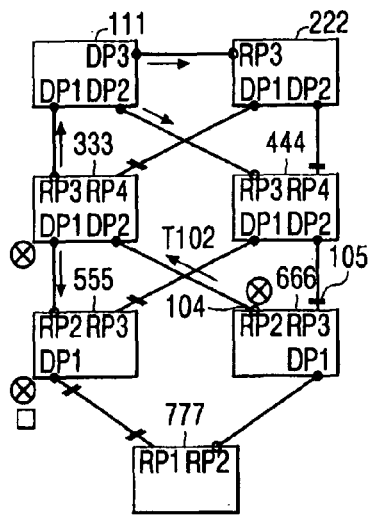
Figure 4E:
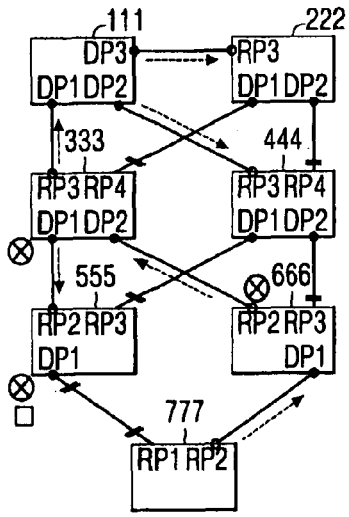

Meantime, a Transmission Control Protocol (TCP) message is transmitted in a broadcasting format and therefore, the transmission of the Transmission Control Protocol (TCP) message is as shown in FIGS. 4C to 4E; however, because the data packet from the host is forwarded in compliance with topology, a transmission path of the data packet is different from that of the Transmission Control Protocol (TCP) message. The dashed arrows as shown in FIG. 4E indicate the TCP messages.

Meantime, link failure determiner 100 of switching device 111, 222, 333, 444, or 666 also determines whether a link failure occurs. That is, link failure determiner 100 can identify that a link failure does not occur.

After that, if switching device 111, 222, 333, 444, or 666 receives a Transmission Control Protocol (TCP) message through any port, host address manager 400 of switching device 111, 222, 333, 444, or 666 marks, as invalid, host address information registered to the port receiving the Transmission Control Protocol (TCP) message.

When host address shift determiner 500 of switching device 111, 222, 333, 444, or 666 identifies an address shift of a host, host address manager 400 of switching device 111, 222, 333, 444, or 666 registers host address information of the host and port information to filtering database 600 when a host address of the host has not been registered to filtering database 600.

Meantime, as shown in FIG. 4C, switching device 666 receives a Transmission Control Protocol (TCP) message from switching device 777 and transmits the Transmission Control Protocol (TCP) message to switching device 333 through an unblocking root port RP2.

Here, because switching devices 666 and 777 have been blocked in the initial network, a host address registered to root port RP2 of switching device 777 has not been registered to designated port DP1 of switching device 666. If an address shift of a host takes place in switching device 666, address information of the host and designated port DP1 information are registered Meantime, host address manager 400 of switching device 666 determines whether a host address of a host has been registered to root port RP2 because root port RP2 of switching device 666 also receives a data packet of the host. At this time, because the host address of the host has not been registered to root port RP2, the host address is registered to root port RP2. That is, because the link between switching devices 555 and 777 fails, a link blocked between designated port DP1 of switching device 666 and root port RP2 of switching device 777 is set to forwarding. This leads to a change in topology.

Meantime, switching device 333 receives a Transmission Control Protocol (TCP) message from switching device 666 through a designated port DP2 (T102 as shown in FIG. 4D), transmits the Transmission Control Protocol (TCP) message to switching device 111 through a root port RP3, and transmits the Transmission Control Protocol (TCP) message to switching device 555 through a designated port DP1.

Thus, host address manager 400 of switching device 333 marks, as invalid, host address information registered to designated port DP2, which received the Transmission Control Protocol (TCP) message, and concurrently, marks, as invalid, all host address information registered to root port RP3 and designated port DP1 transmitting the received Transmission Control Protocol (TCP) message.

After that, when host address shift determiner 500 of switching device 333 identifies an address shift of a host, host address manager 400 of switching device 333 determines whether a host address of the host has been registered to filtering database 600.

When the host address has been registered to filtering database 600, host address manager 400 of switching device 333 changes filtering database 600 by information on a port to which the host address shift is implemented for all the invalid-marked host address information.

In detail, a host address registered to switching device 777 has not been registered to designated port DP2 of switching device 333 because designated port DP2 of switching device 333 does not have a link connection with switching device 777 in the initial network. Thus, the host address is registered to designated port DP2 of switching device 333.

Meantime, the host address registered to switching device 777 has been registered to designated port DP1 of switching device 333 because designated port DP1 of switching device 333 connects with switching device 777 through switching device 555 in the initial network.

Accordingly, when designated port DP2 of switching device 333 receives a data packet from a host registered to both designated port DP1 of switching device 777 and designated port DP1 of switching device 333 through switching device 666, that is, when an address shift of the host is identified, host address manager 400 of switching device 333 changes all host address information registered to designated port DP1 of switching device 333 and marked as invalid, by designated port DP2 of switching device 333.

Meantime, all host address information registered to root port RP3 of switching device 333 are also marked as invalid, however, it is determined that an address shift of a host does not occur because root port RP3 transmitting a data packet of the host is not changed. Therefore, flushing for a host address is not performed.

Switching devices 111, 222 and 444 mark, as invalid, host address information registered to a corresponding port because switching devices 111, 222 and 444 exchange a Transmission Control Protocol (TCP) message with switching devices 333 and 111.

Figure 4F:
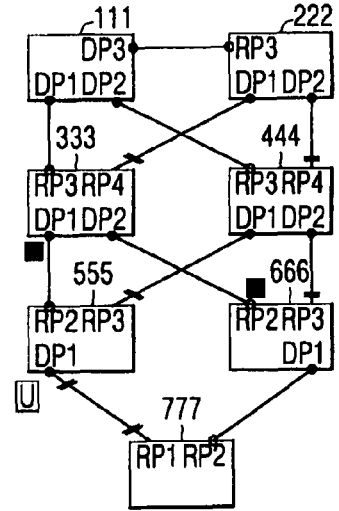

As shown in FIG. 4F, however, after the lapse of any standby time, switching devices 111, 222 and 444 remove an invalid marking of the host address information because a host address shift does not take place in switching devices 111, 222 and 444.

Meantime, not a link failure but a change in bridge priority or port priority causes a change in topology.

Thus, upon receiving a Transmission Control Protocol (TCP) message from any switching device 1, host address manager 400 determines whether the Transmission Control Protocol (TCP) message includes instance information.

If the Transmission Control Protocol (TCP) message includes the instance information, host address manager 400 identifies the Multiple Spanning Tree Protocol (MSTP) member table and changes port information only for host address information that includes the instance information and is marked as invalid.

Host address manager 400 identifies port information included in instance information of the Multiple Spanning Tree Protocol (MSTP) member table and Virtual Local Area Network (VLAN) information and changes port information only for a host address of a port having an inclusion of Virtual Local Area Network (VLAN) information in filtering database 600.

Multiple Spanning Tree Protocol (MSTP) member table 610 includes instance information, Virtual Local Area Network (VLAN) information and port information filtering database 600 includes registered host address information, Virtual Local Area Network (VLAN) information and port information.

Figure 5A:
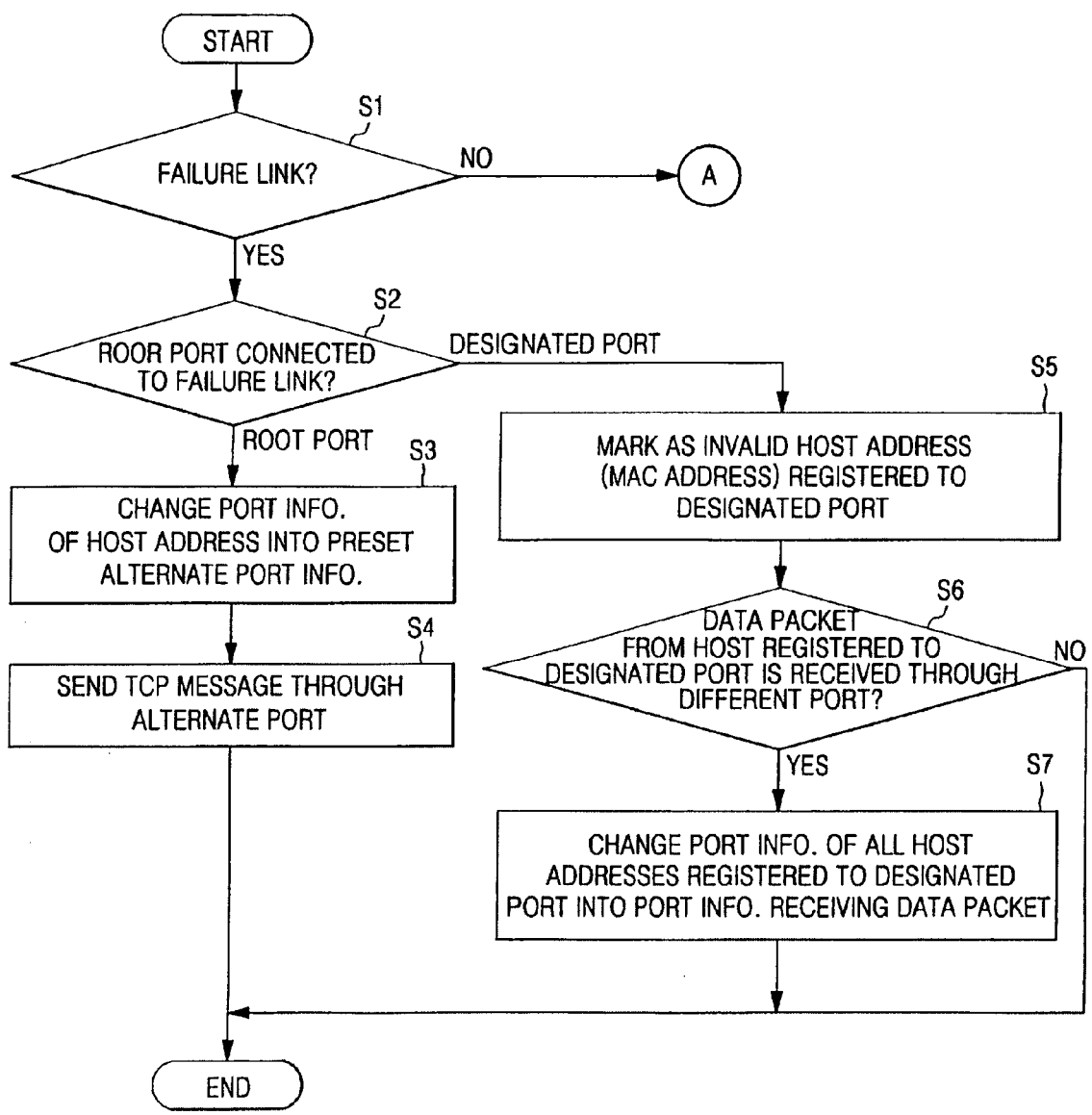
FIGS. 5A and 5B are flow diagrams illustrating a flushing processing method of a switching device in a network using Spanning Tree Protocol (STP) constructed according to the present invention.
Figure 5B:
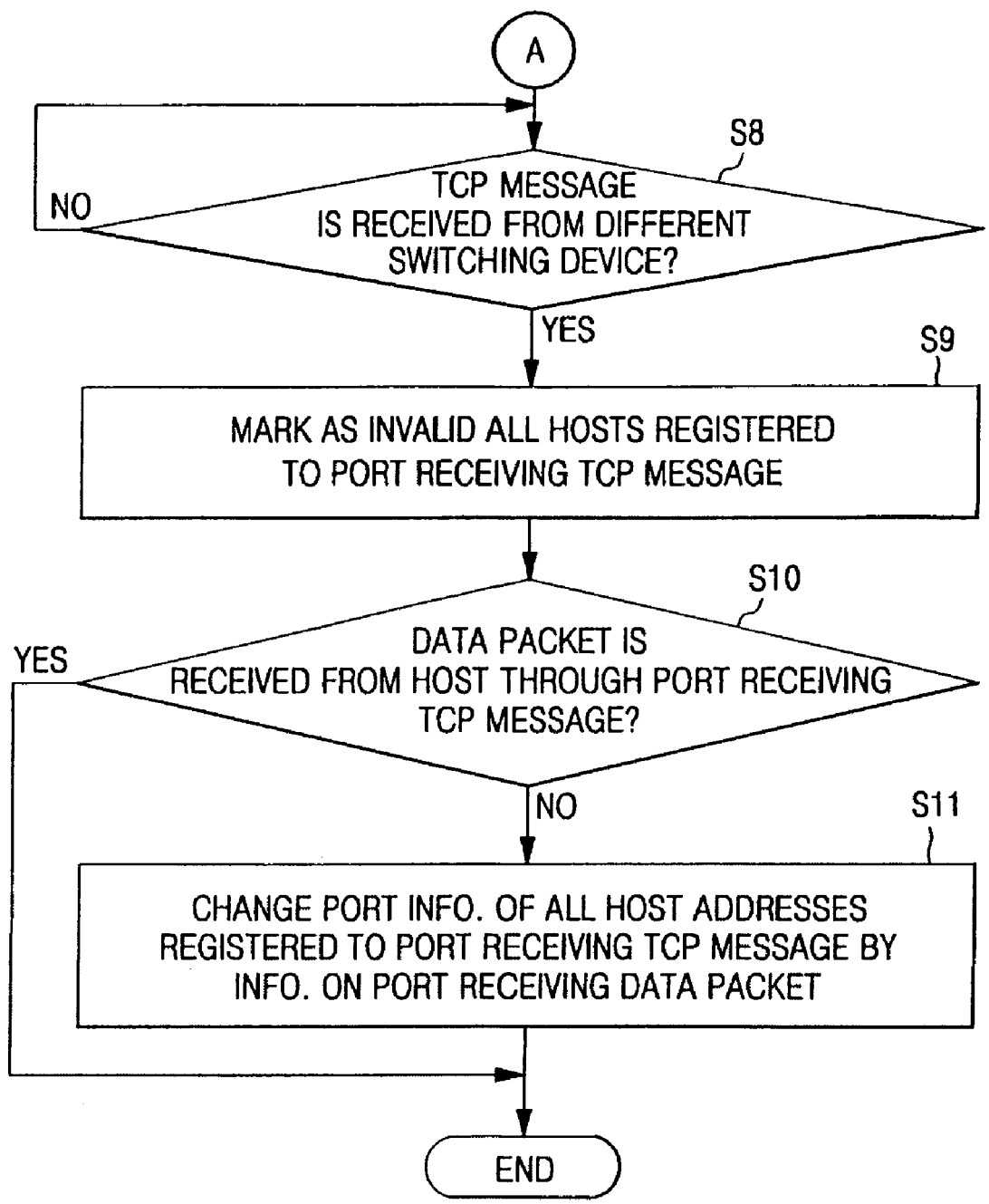

A flushing processing method of the switching device in the network using Spanning Tree Protocol (STP) constructed according to the present invention is described below with reference to FIGS. 5A and 5B.

First, switching device 1 determines whether a failure link occurs in step S1.

When the failure link occurs in step S1, switching device 1 determines which one of a root port and a designated port connects to the failure link in step S2.

When the root port connects to the failure link in step S2, switching device 1 changes filtering database 600 and changes port information of a host address (an MAC address) registered to the root port into preset alternate port information in step S3.

Switching device 1 sends a Transmission Control Protocol (TCP) message to a different switching device 1-1 through an alternate port in step S4.

When the designated port connects to the failure link in step S2 otherwise, switching device 1 marks, as invalid, host address information registered to the designated port in step S5. In step S5, switching device 1 waits for a change in topology for a predetermined standby time after marking, as invalid, the host address information.

After that, switching device 1 determines whether a data packet from any host registered to the designated port is received through a different port in step S6.

When the data packet from any host registered to the designated port is received through the different port in step S6, switching device 1 changes filtering database 600 and changes port information of all host addresses registered to the designated port and marked as invalid into port information receiving the data packet in step S7.

When there is not the failure link in step S1, switching device 1 determines whether switching device 1 receives a Transmission Control Protocol (TCP) message from a different switching device 1-1 in step S8.

When receiving the Transmission Control Protocol (TCP) message from the a different switching device 1-1 in step S8, switching device 1 marks, as invalid, all host address information registered to a port receiving the Transmission Control Protocol (TCP) message in step S9.

The step of marking, as invalid, all the host address information registered to the port receiving the Transmission Control Protocol (TCP) message (S9) is described below in detail with reference to FIG. 6.

Switching device 1 determines whether the Transmission Control Protocol (TCP) message includes specific instance information in step S91.

If the Transmission Control Protocol (TCP) message includes the specific instance information in step S91, switching device 1 identifies instance information, Virtual Local Area Network (VLAN) information and port information in step S92. In step S92, switching device 1 identifies Multiple Spanning Tree Protocol (MSTP) member table 610 including instance information, Virtual Local Area Network (VLAN) information and port information.

After that, switching device 1 changes filtering database 600 and changes, by information on a port receiving a data packet, only host addresses including Virtual Local Area Network (VLAN) information corresponding to an instance among all host addresses registered to a corresponding port in step S93. In step S93, switching device 1 identifies filtering database 600 including registered host address information, Virtual Local Area Network (VLAN) information and port information.

If the Transmission Control Protocol (TCP) message does not include the specific instance information in step S91, switching device 1 marks, as invalid, all host address information registered to a port receiving the Transmission Control Protocol (TCP) message in step S94.

Next, switching device 1 determines whether a data packet from any host is received through the port receiving the Transmission Control Protocol (TCP) message in step S10.

If the data packet from any host is received through a different port not receiving the Transmission Control Protocol (TCP) message in step S10, switching device 1 changes filtering database 600 and changes port information of all host addresses registered to the port receiving the Transmission Control Protocol (TCP) message into information on a port receiving the data packet in step S11.

If the data packet from any host is not received through the different port not receiving the Transmission Control Protocol (TCP) message in S10, switching device 1 terminates Transmission Control Protocol (TCP) message processing.

As described above, in the flushing processing unit and method of the invention, owing to Spanning Tree Protocol (STP), flushing is prevented from taking place at unnecessary ports and bridges upon a change in topology, thereby preventing a process load and a network load increase caused by flooding.

Host address shift is concurrently performed for a port encountering blocking, avoiding the occurrence of additional flooding.

While the present invention has been shown and described in connection with the preferred embodiments, it will be apparent to those skilled in the art that modifications and variations can be made without departing from the spirit and scope of the invention as defined by the appended claims.

What is claimed is:

1. A flushing processing method of a switching device in a network using Spanning Tree Protocol (STP), the method comprising:
   determining, by a first switching device, whether there is a failure link;
   in response to a determination that there is the failure link, determining, by the first switching device, which one of a root port and a designated port connects to the failure link;
   in response to a determination that the root port connects to the failure link, updating, by the first switching device, a filtering database and changing port information of a host address registered to the root port into alternate port information; and
   sending, by the first switching device, a first Transmission Control Protocol (TCP) message through an alternate port;
   in response to a determination that there is no failure link, determining, by the first switching device, whether the first switching device receives a second Transmission Control Protocol (TCP) message from a second switching device;
   in response to a determination that the second Transmission Control Protocol (TCP) message is received from the second switching device, marking, as invalid, by the first switching device, all host address information registered to a port receiving the second Transmission Control Protocol (TCP) message;
   determining, by the first switching device, whether a data packet from any host is received; and
   in response to a determination that a data packet is received through a port not receiving the second Transmission Control Protocol (TCP) message, updating, by the first switching device, the filtering database and changing port information of all host addresses registered to the port receiving the second Transmission Control Protocol (TCP) message into information on a port receiving the data packet.

2. The method of claim 1, further comprising:
   in response to a determination that there is the failure link, determining, by the first switching device, which one of a root port and a designated port connects to the failure link;
   in response to a determination that the designated port connects to the failure link, marking, as invalid, by the first switching device, a host address or a Media Access Control (MAC) address registered to the designated port;
   determining, by the first switching device, whether a data packet from any host registered to the designated port is received through a different port; and
   in response to a determination that a data packet is received through the different port, updating, by the first switching device, the filtering database and changing port information of all host addresses registered to the designated port and marked as invalid into port information of the different port receiving the data packet.

3. The method of claim 1, further comprising:
   in response to a determination that a data packet from any host is not received through the port not receiving the second Transmission Control Protocol (TCP) message, terminating Transmission Control Protocol (TCP) message processing by the first switching device.

4. The method of claim 1, wherein marking, as invalid, all host address information registered to the port receiving the second Transmission Control Protocol (TCP) message further comprises:
   determining, by the first switching device, whether the second Transmission Control Protocol (TCP) message comprises instance information;
   in response to a determination that the second Transmission Control Protocol (TCP) message comprises instance information, identifying, by the first switching device, a port corresponding to the instance information and Virtual Local Area Network (VLAN) information; and
   updating, by the first switching device, the filtering database and changing only host addresses comprising Virtual Local Area Network (VLAN) information corresponding to an instance among all host addresses registered to a corresponding port, using information on a port receiving a data packet.

5. The method of claim 4, further comprising:
   in response to a determination that the received second Transmission Control Protocol (TCP) message does not comprise the instance information, marking, as invalid, by the first switching device, all the host address information registered to the port receiving the second Transmission Control Protocol (TCP) message.

6. The method of claim 4, wherein identifying the port corresponding to the instance information and the Virtual Local Area Network (VLAN) information further comprises identifying a Multiple Spanning Tree Protocol (MSTP) member table comprising the instance information, the Virtual Local Area Network (VLAN) information and port information.

7. The method of claim 4, changing only the host addresses comprising the Virtual Local Area Network (VLAN) information corresponding to the instance further comprises identifying the filtering database comprising registered host address information, Virtual Local Area Network (VLAN) information and port information.

8. The method of claim 1, wherein marking, as invalid, the host address information registered to the port receiving the second Transmission Control Protocol (TCP) further comprises waiting for a standby time for an indication of a change in topology after marking, as invalid, the host address information.

9. A flushing processing unit of a switching device in a network using Spanning Tree Protocol (STP), the unit comprising:
- a link failure determiner to determine whether a failure link occurs;
- a block port determiner to determine which one of a root port and a designated port connects to a failure link, in response to a determination that the failure link occurs;
- a Transmission Control Protocol (TCP) message processor to send a first Transmission Control Protocol (TCP) message through an alternate port in response to a determination that the root port connects to the failure link and to receive a second Transmission Control Protocol (TCP) message; and
- a host address manager, wherein the host address manager is configured:
  - to mark, as invalid, host address information registered to a port receiving the second Transmission Control Protocol (TCP) message, in response to receipt of the second Transmission Control Protocol (TCP) message through any port in a state where no failure link exists; and
  - to update the filtering database and to change port information of the invalid-marked host address information into information on a different port receiving a data packet from a different switching source, in response to a determination that the data packet is received through a port not receiving the second Transmission Control Protocol (TCP) package,
- wherein the host address manager updates a filtering database and changes port information of a host address registered to the root port connecting to the failure link into information on the alternate port sending the first Transmission Control Protocol (TCP) message.

10. The unit of claim 9, further comprising:
- a block port determiner to determine which one of a root port and a designated port connects to a failure link, in response to a determination that the link failure occurs; and
- a host address shift determiner to determine a host address shift in response to receipt of a data packet from a host registered to the port of the failure link through a different port,
- wherein the host address manager:
  - is configured to mark as invalid, host address information registered to the designated port, in response to a determination that the designated port connects to the failure link, and
  - is configured to identify the host address shift, to update the filtering database, and to change port information of the invalid-marked host address information into information on a port receiving the data packet from the different switching device.

11. The unit of claim 10, wherein if the host address shift determiner does not determine a host address shift, after marking, as invalid, the host address information registered to the designated port, the host address manager removes an invalid-marked host address.

12. The unit of claim 10, wherein the host address manager is configured to register host address information of a host and corresponding port information to the filtering database in response to a determination of an address shift of the host where a host address of the host has not been registered to the filtering database.

13. The unit of claim 10, wherein, in response to a determination of an address shift of a host where a host address of the host has been registered to the filtering database, the host address manager, for all invalid-marked host address information, updates the filtering database with information on the port to which the host address shift is implemented.

14. The unit of claim 9, wherein the host address manager is configured:
- to determine whether a second Transmission Control Protocol (TCP) message comprises instance information in response to receipt of the second Transmission Control Protocol (TCP) message from any switching device, and
- to identify a Multiple Spanning Tree Protocol (MSTP) member table and change port information only for host address information comprising the instance information and marked as invalid, in response to a determination that the second Transmission Control Protocol (TCP) message comprises the instance information.

15. The unit of claim 14, wherein the host address manager is configured to identify port information included in instance information of the Multiple Spanning Tree Protocol (MSTP) member table, to identify and Virtual Local Area Network (VLAN) information and to change port information only for a host address of a port having associated with Virtual Local Area Network (VLAN) information in the filtering database.

16. The unit of claim 14, wherein the Multiple Spanning Tree Protocol (MSTP) member table comprises instance information, Virtual Local Area Network (VLAN) information and port information.

17. The unit of claim 15, wherein the filtering database comprises registered host address information, Virtual Local Area Network (VLAN) information, and port information.

18. The unit of claim 10, wherein the Transmission Control Protocol (TCP) message processor is configured to send the second Transmission Control Protocol (TCP) message through a port not receiving the second Transmission Control Protocol (TCP) message if the second Transmission Control Protocol (TCP) message is received through any port from a different switching device.

19. The unit of claim 9, wherein the Transmission Control Protocol (TCP) message processor is configured to send the second Transmission Control Protocol (TCP) message through a port not receiving the second Transmission Control Protocol (TCP) message if the second Transmission Control Protocol (TCP) message is received through any port from a different switching device.

20. The unit of claim 10, wherein the host address manager is configured to wait for a standby time for an indication of a change in topology after marking, as invalid, a host address of any port.

21. The unit of claim 9, wherein the host address manager waits is configured to wait for a predetermined standby time for an indication of a change in topology after marking, as invalid, a host address of any port.

22. A switching device in a network using Spanning Tree Protocol (STP), comprising:
- a plurality of root ports;
- a plurality of designated ports; and a flushing processing unit,
wherein the flushing processing unit comprises:
a link failure determiner to determine whether a failure link occurs;
a block port determiner to determine which one of a root port and a designated port connects to a failure link, in response to a determination that the failure link occurs;
a Transmission Control Protocol (TCP) message processor to send a first Transmission Control Protocol (TCP) message through an alternate port in response to a determination that the root port connects to the failure link and to receive a second Transmission Control Protocol (TCP) message; and
a host address manager, wherein the host address manager is configured:
to mark, as invalid, host address information registered to a port receiving the second Transmission Control Protocol (TCP) message, in response to receipt of the second Transmission Control Protocol (TCP) message through any port in a state where no failure link exists; and
to update the filtering database and to change port information of the invalid-marked host address information into information on a different port receiving a data packet from a different switching source, in response to receipt of the data packet through a port not receiving the second Transmission Control Protocol (TCP) message, and
wherein the host address manager updates a filtering database and changes port information of a host address registered to the root port connecting to the failure link into information on the alternate port sending the first Transmission Control Protocol (TCP) message.

* * * * *